United States Patent [19]

Prakash et al.

[11] Patent Number: 5,692,065
[45] Date of Patent: Nov. 25, 1997

[54] APPARATUS AND METHOD FOR DETERMINING IMAGE QUALITY

[75] Inventors: Ravinder Prakash, Concord; Michael J. Woolley, Charlotte; Dale D. Decker, Harrisburg, all of N.C.

[73] Assignee: International Business Machines Corporation, Armonk, N.Y.

[21] Appl. No.: 292,545

[22] Filed: Aug. 18, 1994

[51] Int. Cl.$^6$ .................................................. G06T 7/00
[52] U.S. Cl. ...................................... 382/112; 382/309
[58] Field of Search ................................. 382/112, 274, 382/275, 286, 309, 167, 255, 270, 273, 199, 266, 206; 348/125, 128, 353, 356; 358/504

[56] References Cited

U.S. PATENT DOCUMENTS

| | | | |
|---|---|---|---|
| 3,981,579 | 9/1976 | Weinert et al. | 355/18 |
| 4,379,632 | 4/1983 | Dedden et al. | 355/68 |
| 4,427,998 | 1/1984 | Huntoon | 358/294 |
| 4,467,364 | 8/1984 | Konagaya | 358/280 |
| 4,519,041 | 5/1985 | Fant et al. | 364/552 |
| 4,523,231 | 6/1985 | Therrien | 358/139 |
| 4,647,981 | 3/1987 | Froelich | 358/285 |
| 4,649,422 | 3/1987 | Rauskolb et al. | 358/504 |
| 4,660,094 | 4/1987 | Yoshimoto et al. | 358/285 |
| 4,710,963 | 12/1987 | Chapman et al. | 382/112 |
| 4,724,330 | 2/1988 | Tuhro | 250/578 |
| 4,757,389 | 7/1988 | Clark et al. | 358/298 |
| 4,888,812 | 12/1989 | Dinan et al. | 382/286 |
| 4,941,186 | 7/1990 | Massmann et al. | 382/54 |
| 5,025,478 | 6/1991 | Morris et al. | 382/22 |
| 5,048,106 | 9/1991 | Nakajima et al. | 382/47 |
| 5,124,810 | 6/1992 | Seto | 358/106 |
| 5,126,856 | 6/1992 | Abe | 358/406 |
| 5,144,566 | 9/1992 | Anderson et al. | 382/112 |
| 5,255,331 | 10/1993 | Kelly | 382/50 |
| 5,384,859 | 1/1995 | Bolza-Schunemann | 382/112 |

OTHER PUBLICATIONS

IBM Technical Disclosure Bulletin, "Optical Scanner Maintenance and Initialization", by R. H. Estry, R. D. Keillor, J. L. Lovgren and P. J. Traglia, vol. 19, No. 1, Jun. 1976, pp. 254–255.

*Primary Examiner*—Joseph Mancuso
*Assistant Examiner*—Jon Chang
*Attorney, Agent, or Firm*—Kenneth A. Seaman; Karl O. Hesse

[57] ABSTRACT

Invented method, apparatus, and computer program product for determining image quality can be employed either during diagnostic mode or at run time of an imaging system. One component performs numerical analysis on a digital image. Another component accepts or rejects the quality of the digital image based on the results of the numerical analysis. In one embodiment, if the cumulative harmonic content of Fourier component amplitudes of a synthesized scan line exceeds a threshold value, the digital image is rejected as being of inadequate quality; otherwise the digital image is accepted. In another embodiment, a maximum gradient of a scan line of the digital image is computed. If, for some specified number of occurrences during a scan of a target, the maximum gradient exceeds a ceiling value or falls below a floor value, then the image is rejected.

12 Claims, 8 Drawing Sheets

IMAGE DATA WITH DUST

IMAGE DATA NO DUST

APPARATUS AND METHOD FOR DETERMINING IMAGE QUALITY

BACKGROUND OF THE INVENTION

1. Field of the Invention

The present invention relates to a method and apparatus for determining image quality. More particularly, the present invention relates to a method, apparatus and computer program product for determining the quality of images which have been scanned using imaging apparatus, such as a document scanner.

2. Description of Related Art

Image processing has burgeoned in the last several years. The advent of powerful, yet relatively low cost, computers have ushered in a variety of image processing applications. For example, documents can now be scanned, converted to digital form, and manipulated in a number of ways for various purposes. The United States Patent Office's Automated Patent System (APS) stores certain patents in digitized form for search and retrieval purposes. Banks routinely process checks and other financial instruments based on information gleaned from a digital image of a document. The availability of low cost desktop and handheld scanner devices has also precipitated image processing by individuals and small businesses.

As users of image processing place more and more reliance on the technology, the need to ensure quality becomes acute. In general, the quality of an imaging system can be monitored by examining either the system itself or the product of the system (i.e., the digital image produced by the system). The system itself can be monitored by examining responses received from control points within the system, such as hardware or software components. Unfortunately, the following types of quality problems may not be detectable by examining system control points:

- dust accumulation in the illumination and imaging system (s) or other optical or electronic defocus;
- bad CCD, photo diode element(s), or picture element(s) (pel(s));
- analog processing failures;
- loose cables/connections, and defective components;
- analog/digital conversion failures due to circuit failures or maladjusted reference points; and
- data path problems due to shorts/opens on printed circuit cards in areas where standard techniques such as parity and checksums are not employed.

Since these problems may not be detectable by examining the system control points in the system, unacceptable images may not be detected until the problem is discovered visually by an end user. It is important to detect and report these problems as soon as they occur. This is especially true in a high speed scanner application (e.g., image processing of bank checks) since the end user cannot monitor the scanner output quality in real time.

A typical technique for determining problems is to present a test target to the scanner and analyze the scanner output. The problem is that this interferes with normal use of the scanner and reduces scanner throughput. Some known techniques (e.g., histogram analysis) attempt to overcome this problem by analyzing scanner output to determine if one gray level is more prevalent in the image that any other. Since these techniques make assumptions about the type of document that will be scanned (e.g., multi-shade or color document), they are only useful for certain applications (e.g., diagnostic mode testing). These techniques are also insensitive to isolated pel failures.

SUMMARY OF THE INVENTION

The invented method, apparatus, and computer program product for determining image quality can be employed either during diagnostic mode or at run time of an imaging system. One component performs numerical analysis on a digital image. Another component accepts or rejects the quality of the digital image based on the results of the numerical analysis. In one embodiment, if the cumulative harmonic content of Fourier component amplitudes of a synthesized scan line exceeds a threshold value, the digital image is rejected as being of inadequate quality; otherwise the digital image is accepted. In another embodiment, a maximum gradient of a scan line of the digital image is computed. If, for some specified number of occurrences during a scan of a target, the maximum gradient exceeds a ceiling value or falls below a floor value, then the image is rejected.

One advantage of the present invention is the ability to identify problems that can only be detected by inspection of the image data and to automatically notify the end user of the problem.

Another advantage of the present invention is the ability to reliably diagnose imaging system hardware problems, including dead pel(s)/segment(s), optical or electronic defocus, and loose cables/connections.

Yet another advantage of the present invention is the ability to identify defective images, which suggest a hardware/software problem, the first time the problem occurs.

Another advantage of the present invention is the ability to monitor scanner performance over extended periods of time (e.g., weeks or months).

The foregoing and other advantages of the present invention will be apparent to those skilled in the art of imaging technology in view of the accompanying drawings, description of the invention, and appended claims.

DESCRIPTION OF THE PREFERRED EMBODIMENTS

Figure 1:
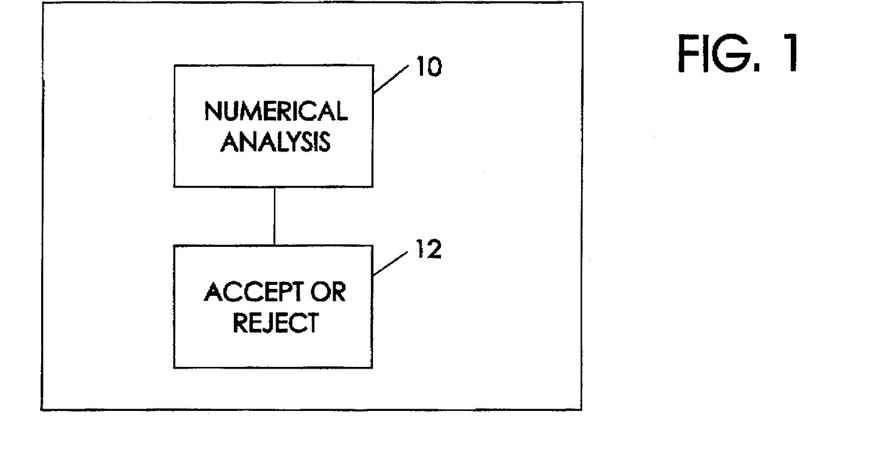
FIG. 1 is a block diagram of the basic elements of the present invention.

Referring now to FIG. 1, a block diagram provides an overview of the invented method, apparatus, and computer program product. The present invention can be employed either during diagnostic mode or at run time of an imaging system. 10 refers to a step or means for performing numerical analysis on a digital image. 12 refers to a step or means for accepting or rejecting the quality of the digital image based on the results of the numerical analysis. As used herein, "accept" means to meet some criteria and "reject" means to not meet that criteria. Once a digital image is accepted or rejected, other action may occur (e.g., notifying the end user or discarding the image).

Figure 2:
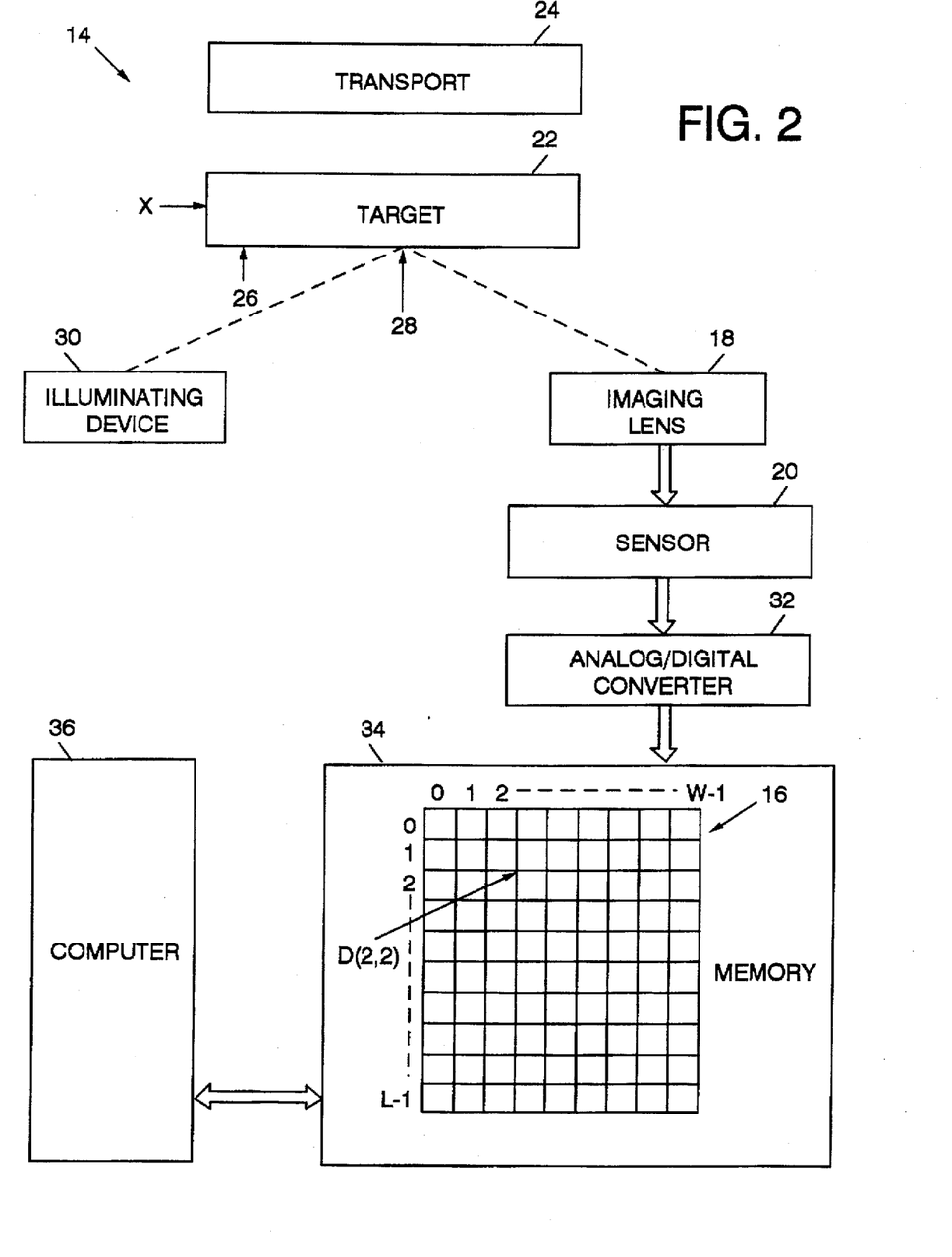
FIG. 2 is a block diagram of a structural environment in which the present invention can be employed.

An illustrative system 14 for collecting a digital image 16 is shown in FIG. 2. The system 14 includes a focusing or imaging lens 18 and uses a sensor 20 to capture an electrical representation of each line of a document or other target 22, based on either the black/white or gray characteristics of the target.

The target 22 to be imaged can be either stationary or transported by a moving track, moving conveyor line, rotating drum, or other transport 24, along a path beneath the imaging lens 18. The target 22 is scanned to obtain data corresponding to indicia 26 existing on the target. The target 22 is moved in the direction X so that all portions of the target are eventually illuminated by a line of light 28 which is produced by illuminating devices 30 of the system. This line 28 extends across the target 22 in a direction which is perpendicular to direction X.

Reflections from the indicia 26 illuminated by the line 28 are focused by the imaging lens 18 onto the sensor 20. The imaging lens 18 can be a graded index fiber lens or a conventional spherical lens, in which case the sensor could be shorter than the length of the line. The sensor 20 is commercially available from various manufacturers and can be, for example, an array of photodiodes, a photoarray, or a charge coupled device (CCD) in which the impinging light on each sensor develops an electrical signal proportional to the amount of light. Each line of the sensor develops a number of pels (e.g., 1024), with each pel having a particular gray scale value (e.g., a value from 0 to 255), which value represents a portion of the target being scanned. The composite of these lines of the target 22 provides a digital image of the target being scanned.

Data obtained by the sensor 20 is appropriately clocked out of the sensor and transferred to other electronic circuits of the system 14. The electrical signals pass on line to an analog-to-digital converter 32, which converts each pel into a digital representation which is then stored in memory 34 for storage and further processing by a computer 36 as desired. Memory 34 is preferably a random access memory (RAM) or other high speed electronic memory. For purposes herein, "computer" includes a device capable of performing the functions of a Turing Machine, including a microcomputer, minicomputer, or mainframe computer. A Turing Machine is a well-known computer science concept and is explained in Encyclopedia of Computer Science, Ed. Anthony Ralston, ISBN 0-88405-321-0, which is specifically incorporated herein by reference. For further details of an image capture and processing system, see U.S. Pat. No. 4,888,812 to Dinan et al., which is specifically incorporated herein by reference.

With the foregoing overview and background in mind, the following embodiments of the present invention are described.

Fourier Analysis

One embodiment of the present invention is a method for determining image quality of a digital image wherein if the cumulative harmonic content of Fourier component amplitudes of a synthesized scan line exceeds a threshold value, the digital image is rejected as being of inadequate quality; otherwise the digital image is accepted. If consecutive targets exhibit the problem, then there is a high likelihood of a scanner problem.

Figure 3:
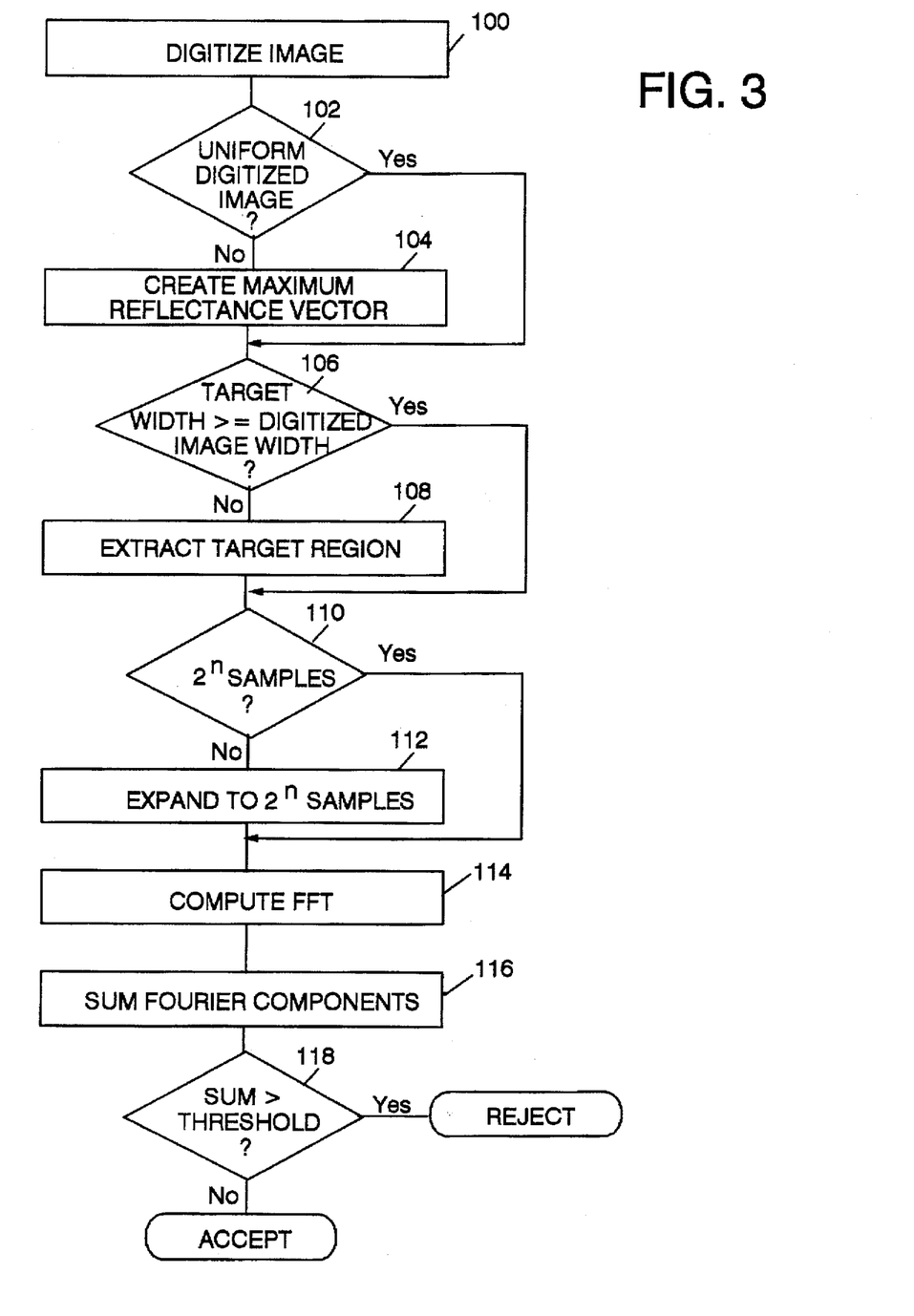
FIG. 3 is a flow chart of the Fourier analysis embodiment of the present invention.

FIG. 3 is a flow chart of a preferred implementation. The first step is to commence collecting a two-dimensional digital image, step 100. Once collected, the digital image comprises an L×W matrix of numbers, D, where L is the number of matrix rows and W is the number of matrix columns. Each number is a measure of the light intensity (or reflectance) relative to a target and is contained within a cell denoted $D_{ij}$ (where i=0 to L−1 and j=0 to W−1).

Each number in matrix D is referred to herein as a "pel". For convenience, the numeric representation of a pel is assumed to be in decimal format herein, although it could also be represented in any one of a number of other formats (e.g., binary, hexadecimal, etc). The matrix is referred to herein as the "scan area". A particular column in the matrix or scan area is referred to herein as a "scan line".

The digital image is collected using conventional imaging technology well known to those skilled in the art, and illustratively discussed above in connection with FIG. 2. For example, the image can be collected using an IBM 3897 image capture system or an IBM 3119 document scanner, both available from IBM Corporation. Of course, other commercially available imaging apparatus or document scanners can also be employed (e.g, LogiTech handheld scanners, Hewlett-Packard desktop scanners, etc).

If the reflectance of the entire target is non-uniform (i.e., more than one shade or color), step 102, then a maximum reflectance vector, v, is computed from the digital image, step 104, otherwise such a vector need not be computed. The latter case typically corresponds to a situation wherein a scan of a target with no printing (e.g., solid white, blue, etc.) is made during diagnostic mode. The former case is typical during run-time since it is desirable to collect the scan without requiring the user to present a special target to the scanner.

The maximum reflectance vector is created by selecting and storing the digital value of the pel representing the highest reflectance within each of the L rows of the image. Typically, although not necessarily, the highest reflectance value is white, represented by zero, and the lowest reflectance value is black, represented by 255. The maximum reflectance vector can be computed "on-the-fly" as each scan line is imaged and stored in D, or after the entire scan area has been stored. The following pseudocode is illustrative:

initialize all $v_i$ to the maximum value (e.g., 255)

for j = 0 to W−1 for i = 0 to L−1

$v_i := min(v_i, D_{ij})$ end end

Figure 4:
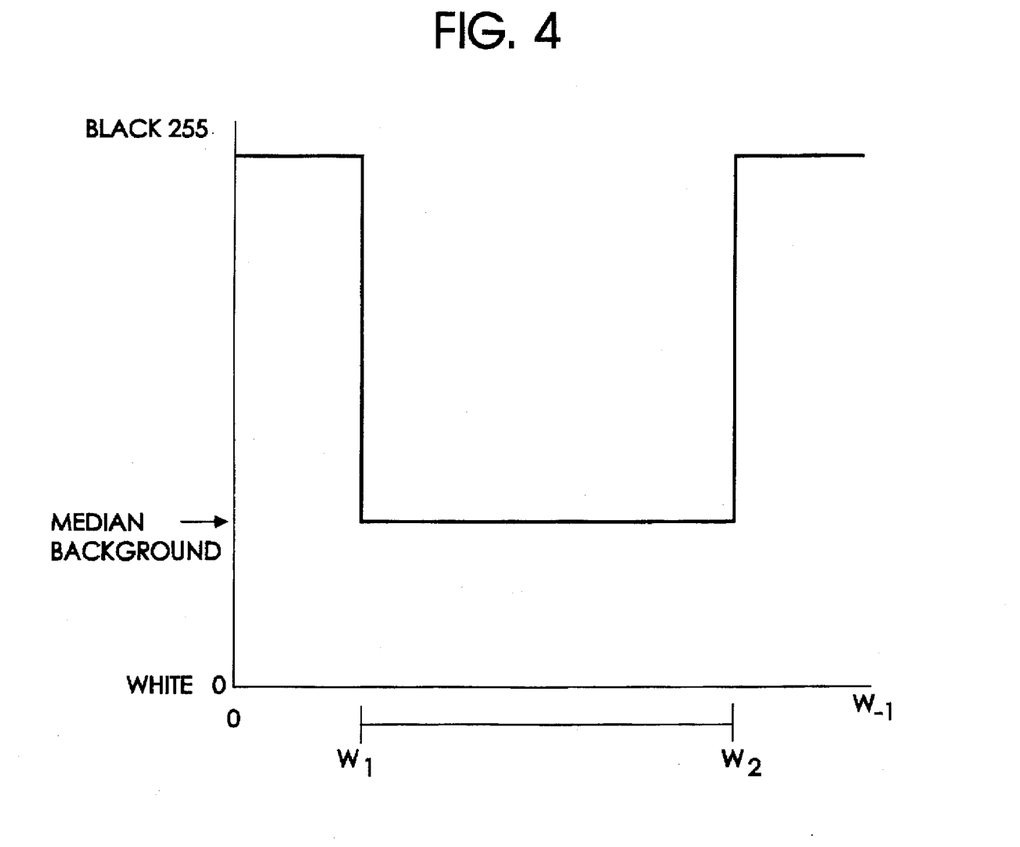
FIG. 4 is a graph diagram of an example maximum reflectance vector data.

If the maximum reflectance vector indicates that the target comprises only a portion of the scan area, step 106, then that portion is extracted, step 108. The portion $W_1$ to $W_2$ in FIG. 4, for example, would be extracted so as to omit those portions (0 to $W_1$ and $W_2$ to W−1) representative of the transport rather than the target. The result is a modified v, where the number of elements in v, denoted w, is less than or equal to W. If w is less than a power of 2, $2^n$, step 110, then the vector is expanded to include $2^n$ pels, step 112, in order to optimize step 114. For example, if the vector contained only 70 pels after step 108, then it would be expanded to the next higher power of 2 (i.e., 128) by interpolation. The values in the vector are then assumed to be the video level of the background of the target and this "synthesized scan line", v, is treated as the scan needed for analysis.

The synthesized scan line, v, is analyzed by calculating Fourier component amplitudes, step 114, assuming the scan to be a periodic function. Fourier component amplitudes, A(u), are computed in step 114.

$$A(u) = \left| \frac{1}{N} \sum_{x=0}^{N-1} v(x) \exp[-q2ux/N] \right|$$

where $q=\sqrt{-1}$, and N is the number of elements in the synthesized scan line, v.

Preferably, step 114 is computed using the Fast Fourier Transform (FFT) algorithm. Techniques for implementing FFT are well known to those skilled in the art. The following texts describe techniques for implementing step 114 and are incorporated herein by reference: "Digital Image Processing", by R. C. Gonzalez, P. Wintz, ISBN 0-201-11026-1, Addison-Wesley Publishing Company (1987); and "Digital Signal Processing", Ed. by L. R. Rabiner, C. M. Rader, ISBN 0-87942-018-9, IEEE Press (1972).

Selected Fourier component amplitudes are summed in step 116. By way of example, the fundamental, A(1), and nineteen harmonics amplitudes, A(2) to A(20), can be summed. The summation does not contain the average or DC component, A(0), and is therefore independent of the average background reflectance. Also, components which exhibit unusual spikes or other disturbances are excluded.

If the summation of the Fourier component amplitudes exceeds a threshold value, step 118, then the digital image is rejected; otherwise it is accepted. The threshold value depends on the base quality of the device used to digitize the image and is therefore determined experimentally. The summation shows a distinct correlation to the problems being diagnosed since it exhibits a much higher value as compared to the value calculated from a scan free of such problems. This is an improvement over techniques based on video thresholding, which analyze only background video level.

Figure 4A:
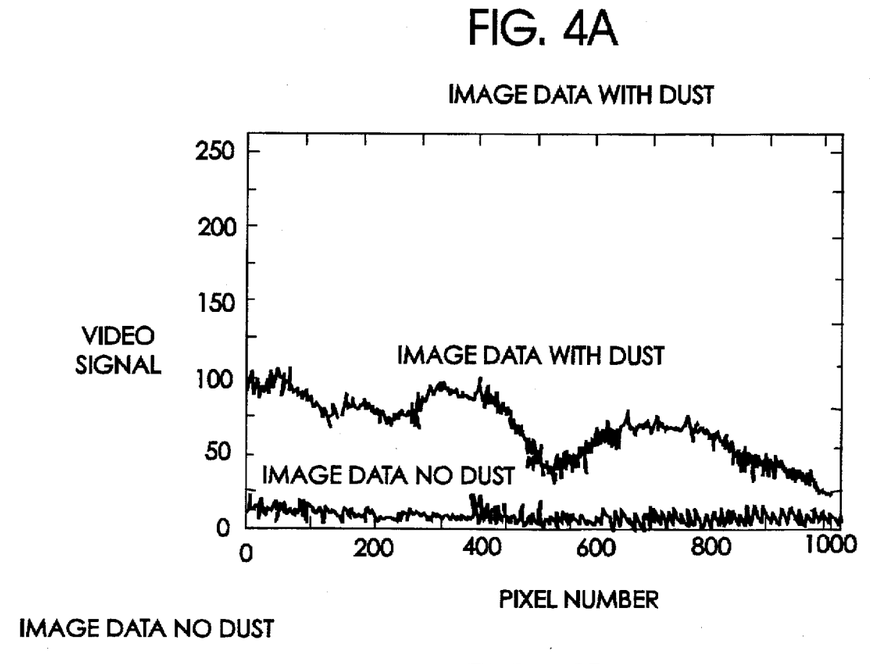
FIG. 4a through 4g are graph diagrams which illustrate the quality problems which can be identified by the Fourier Analysis embodiment of the present invention.
Figure 4B:
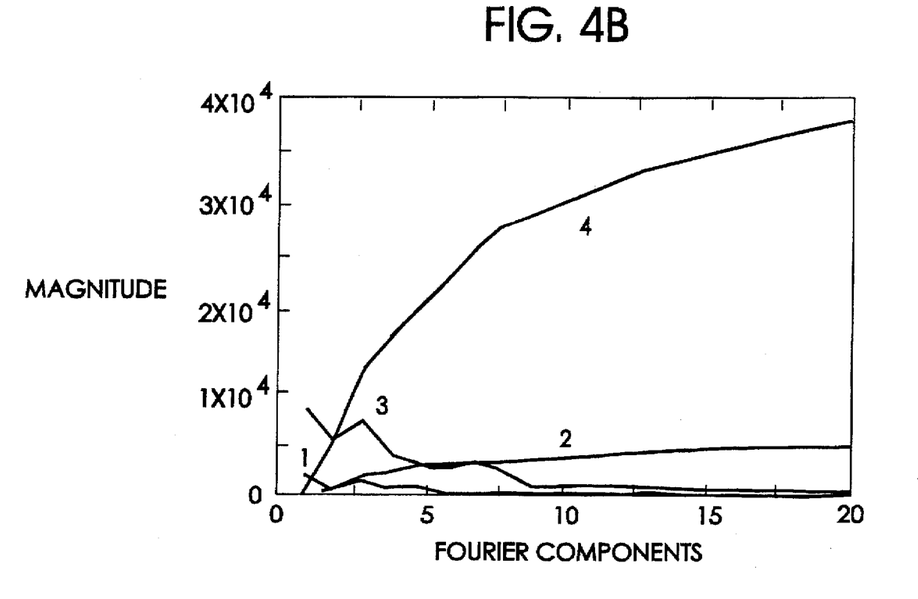

FIGS. 4a through 4g graphically illustrate types of quality defects which can be identified using the Fourier Analysis embodiment of the present invention. FIG. 4a is a graph of a scan illustrating the presence of dust in the illumination system. Dust rarely settles uniformly. Results are evident from the scanned data. This non-uniformity of the image data results in growth of harmonic content of Fourier component amplitudes, as shown in FIG. 4b, which growth is used to identify a quality problem.

In FIG. 4b, reference curve 1 shows Fourier component amplitude of image data without dust and reference curve 2 shows the associated cumulative summation of the Fourier components amplitude. Reference curve 3 shows Fourier component amplitude of image data with dust and reference curve 4 shows the associated cumulative summation of the Fourier components amplitude. Note the difference in the cumulative summation values between reference curves 2 and 4.

Figure 4C:
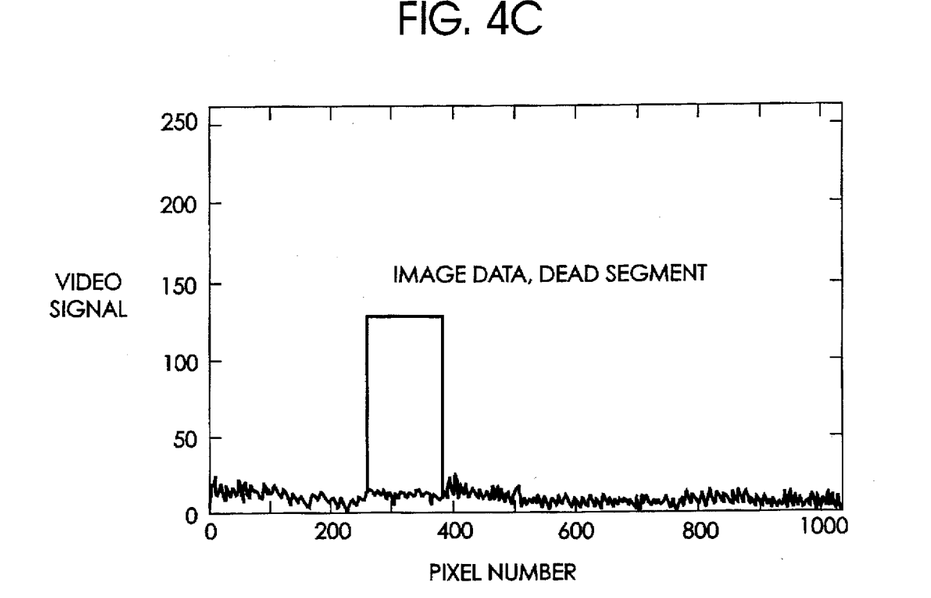
Figure 4D:
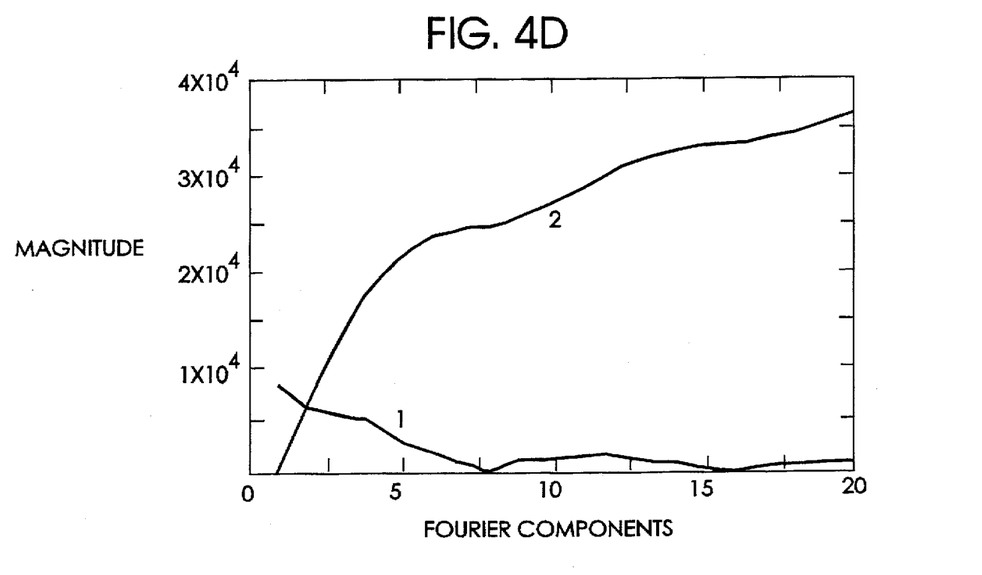

FIG. 4c illustrates video output of a 1024 CCD device having sixteen segments. One segment is shown dead. Every pel in this interleaved segment is shown having a video level of 128. Although a video level of 128 (<255) has been used in the example, a higher value can be used to provide higher detectability. The problem may lie in the CCD analog card or in subsequent signal processing cards. The video data corresponding to pels 256, 258, 260 . . . 384 (64 pels) in FIG. 4c is set to 128. Remaining pals illustrate normal output. FIG. 4d illustrates the corresponding Fourier analysis results. Reference curve 1 shows Fourier component amplitude of image data with a dead segment and reference curve 2 shows the associated cumulative summation of the Fourier components amplitude. The cumulative summation is above the normal sum.

Figure 4E:
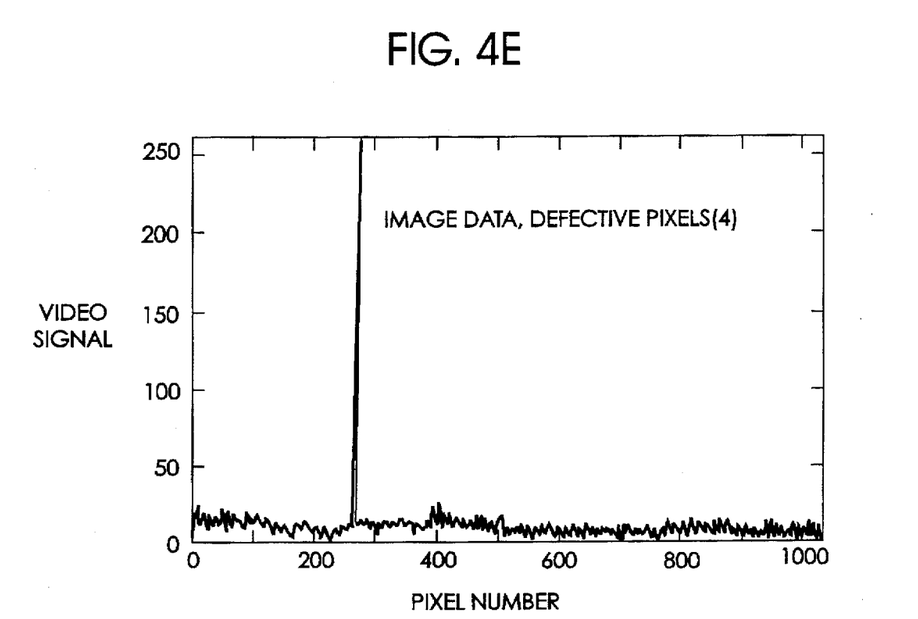
Figure 4F:
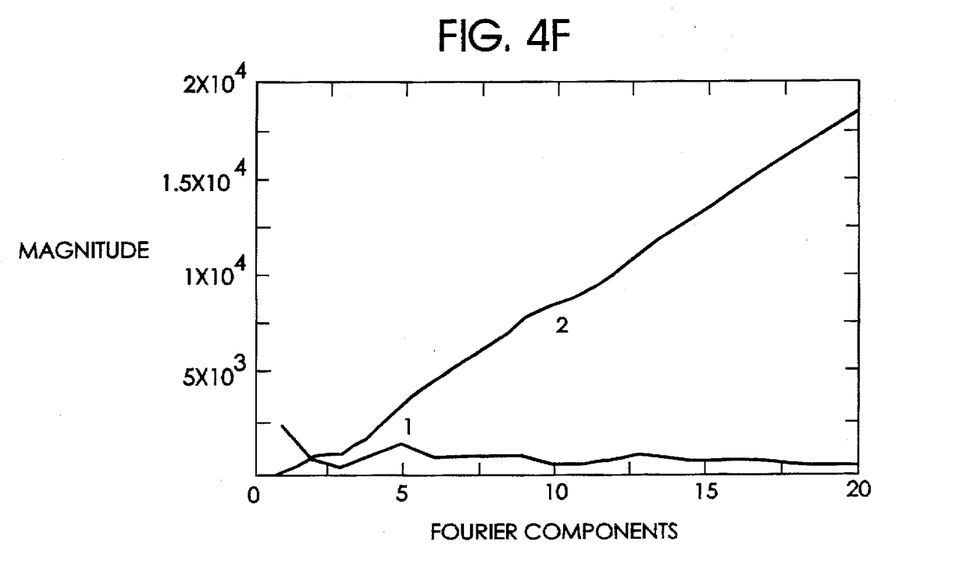

FIG. 4e illustrates a situation where four consecutive pels are dead (i.e., video level is 255). This condition may occur due to either an electronics failure or due to the presence of a dust particle on the optical viewing window. In this illustration, only one region exhibits the problem, i.e., only pels 257, 258, 259 and 260 have been blocked. FIG. 4f shows the corresponding Fourier component amplitudes for the dead pel condition illustrated in FIG. 4e. Reference curve 1 shows Fourier component amplitude of image data with four blocked pels and reference curve 2 shows the associated cumulative summation of the Fourier components amplitude. Again, the cumulative summation is above the normal sum.

Figure 4G:
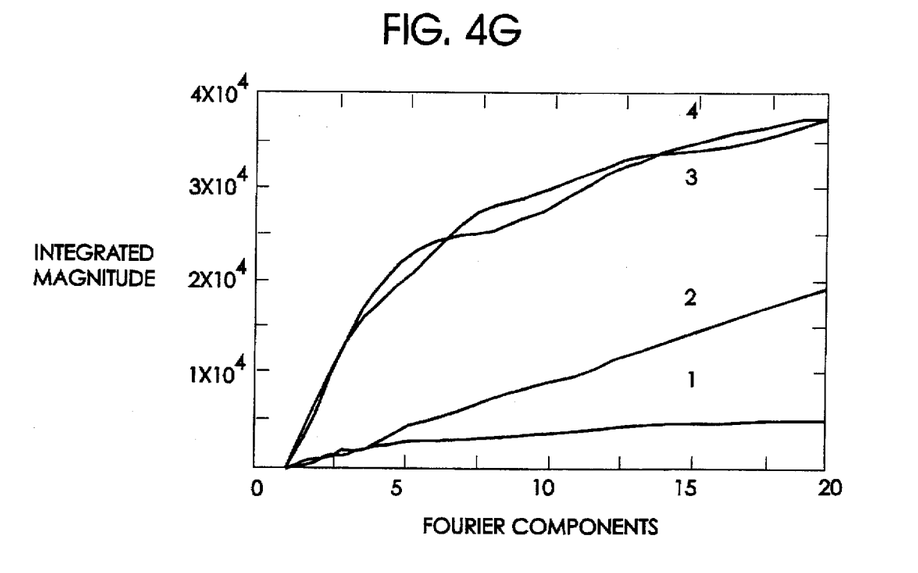

FIG. 4g plots the cumulative summation for each of the three abnormal conditions illustrated in FIGS. 4b, 4d, and 4f, along with their associated normal sums. By suitably selecting an amplitude threshold (e.g., 10000), one can distinguish between a normal function (1) and an abnormal function (2, 3, or 4).

Gradient Analysis

In another embodiment, a maximum gradient of a scan line of the digital image is computed. For a given imaging system, the maximum video gradient value, G, computed will fall between a ceiling value, $G_{max}$, and a floor value, $G_{min}$. Properties inherent in the system design, such as resolution, illumination, and optical quality, limit G to some $G_{max}$. G should equal or exceed some $G_{min}$ because the system should always meet some minimum performance criteria. No test target is necessary for gradient analysis and the analysis does not require a lot of computations. Thus it can be performed real time without impacting scanner throughput. If a problem arises, it can be identified on the first image affected and problems as small as a single pal failure can be detected.

In an imaging system, the overall modulation transfer function (MTF) achieved by the system defines the system's ability to resolve fine details in an image. If the MTF is low then the system will produce images with softened edges. The crispness of the edges can be quantified by computing the maximum video gradient present in a scanned image. Soft edges will result in low gradient values. Sharp edges will result in high gradient values.

Figure 5:
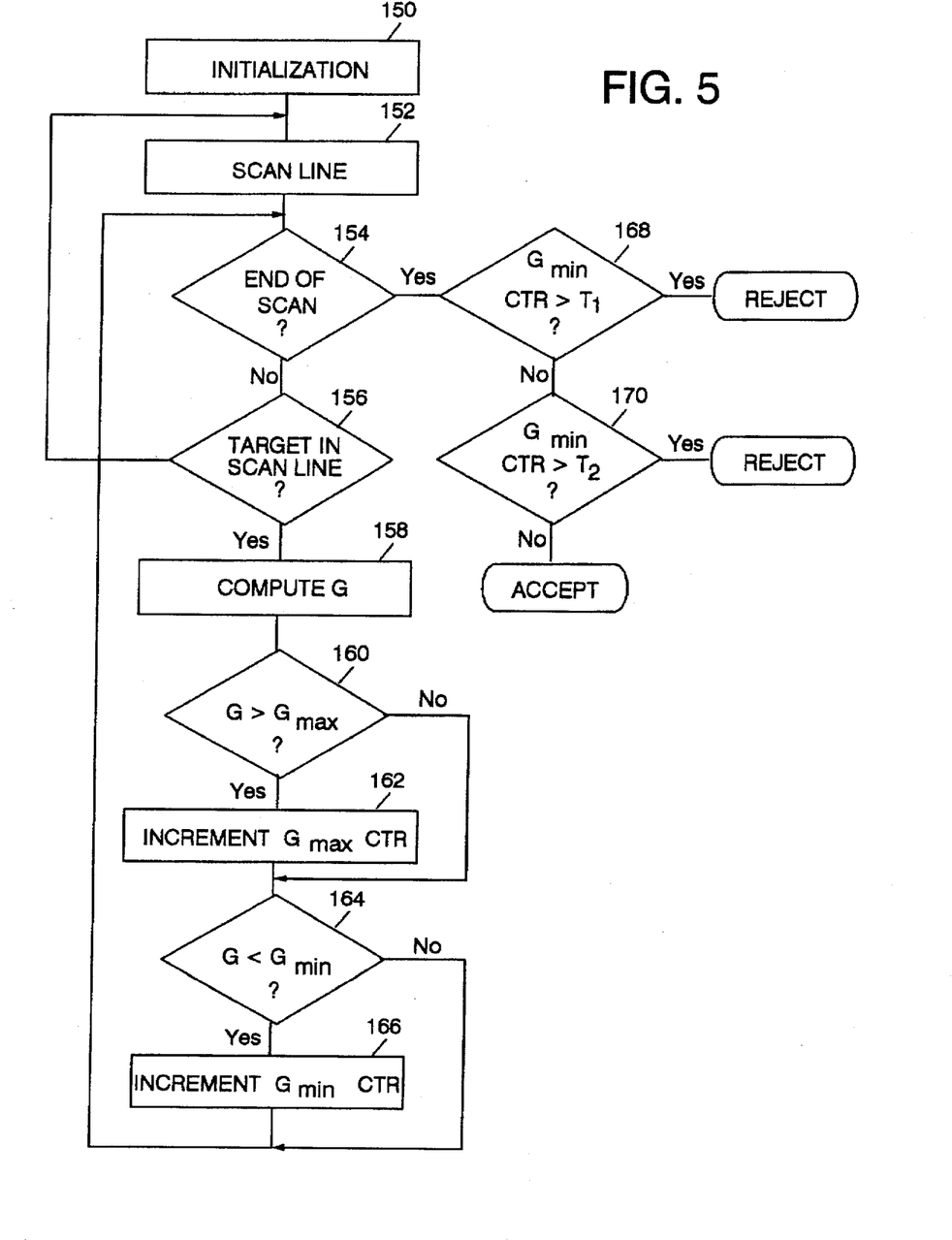
FIG. 5 is a flow chart of the Gradient Analysis embodiment of the present invention.

FIG. 5 is a flow chart of a preferred implementation at the beginning of each target scan. The following description assumes that G is computed on at least one column in D. The invention can also be applied in a row-wise fashion, or in a column-wise and row-wise fashion concurrently.

In step 150, counters (CTR) $G_{min}$ CTR, $G_{max}$ CTR, and threshold variables T1, T2, and T3, are initialized. Then, in step 152, a line is scanned such that a scan line, is created. If the scan line does not include at least some portion of the target, step 156, then another line is scanned until the target is located, step 156, or the scan is complete, step 154.

Once the target has been located, the maximum pel-to-pel difference (in absolute value terms), G, within the scan line is computed in step 158. G can be computed "on-the-fly" as each scan line is imaged and stored in D, or after the entire scan area has been stored. For a given scan line j in matrix D, G is illustratively computed in pseudocode as follows:

initialize G and $allg_i$ to zero for i = 0 to L−2

$$g_i := D_{ij} - D_{i+1,j}$$

end $$G = \max(\ g_i\ )$$

If G is greater than $G_{max}$, step 160, then $G_{max}$ CTR is incremented, step 162. Similarly, if G is less than $G_{min}$, step 164, then $G_{min}$ CTR is incremented.

Once the scan is complete, then the following analysis is made. If $G_{max}$ CTR is greater than T1, step 168, then the digital image is rejected since this indicates that dead video pel(s)/segment(s) were discovered. If $G_{min}$ CTR is greater than T2, step 170, then the digital image is also rejected since this indicates that the camera is non-responsive (e.g., out of focus); otherwise, the digital image is considered acceptable. By way of example, T1 might be set to 16, whereas T2 might be set to 2. The precise values will vary depending on the characteristics of the scanner and the tolerances chosen by a particular designer.

Figure 6:
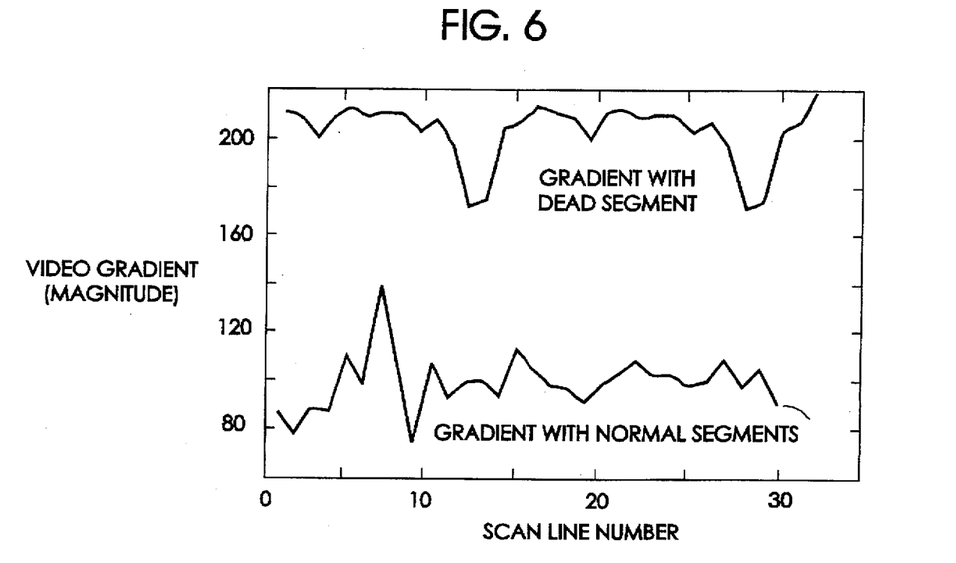
FIG. 6 is a graph diagram which illustrates a quality problem which can be identified by the Gradient analysis embodiment of the present invention.

Dead pel(s) in the system will cause the maximum video gradient to exceed the possible range. Even a single pel failure will easily be detected. FIG. 6 illustrates the maximum video gradient computed for 32 scans taken from a scanner that has one dead pixel and a scanner that has no problems. The top plot corresponds to dead pixel or dead segment (Avg. 204, 1 sigma 13). The bottom plot corresponds to normal focused scanner (Avg. 99, 1 sigma 12). The difference between the maximum video gradient computed with and without a dead pixel exceeds 64 for all scans. By choosing an appropriate threshold, a dead pixel is detectable in the system and can be detected on the first document affected.

In order to monitor the longer term quality of an imaging device, an average maximum video gradient can also be advantageously employed. T3 is initialized to zero at the beginning of each document scan. Following each scan, if T3<$G_{max}$, then T3 is incremented by one. This process continues until the end of the document scan. Then, T3 is stored in memory, and T3 is reset to zero. For each day, a certain number of T3 values are averaged. The average value reflects the scanner performance. A spline fit through these points over several days/weeks of data provides a measurable parameter that indicates the changes taking place in the scanner performance. When this value falls below a programmable threshold, the user is alerted to take corrective action.

Preferably, the numerical analysis and acceptance/rejection elements of the present invention are performed by a computer program, that is, a series of stored program instructions, executing on a computer. During operation, the computer program comprises a special purpose apparatus for determining image quality. Further, the computer program, when stored on a computer readable medium such as a flexible diskette, hard disk, CD-ROM, or other similar device, comprises an article of manufacture. Alternatively, the invention may be embodied in an electronic device which includes circuitry for performing the functions corresponding to the described numerical analysis and acceptance/rejection elements.

Of course, many modifications and adaptations to the present invention could be made to advantage without departing from the spirit of this invention. Further some features of the present invention could be used without corresponding use of other features. Accordingly, this description should be considered as merely illustrative of the principles of the present invention and not in limitation thereof.

We claim:

1. Method for determining performance of an image capture device collecting a digital image, D, wherein D is represented as an L×W matrix of numbers representative of light intensity contained within cells denoted as $D_{ij}$, where i=0 to L−1, j=0 to W−1, L is the number of matrix rows, and W is the number of matrix columns, comprising the steps of:

(a) performing numerical analysis on the digital image with a computer by computing a maximum gradient of at least one scan line;

(b) rejecting the digital image when the maximum gradient is above a ceiling threshold value; and (c) accepting performance of the image capture device when an average of maximum gradient values over some period of time exceeds a predefined threshold.

2. Apparatus for determining performance of an image capture device collecting a digital image, D, wherein D is represented as an L×W matrix of numbers representative of light intensity contained within cells denoted as $D_{ij}$, where i=0 to L−1, j=0 to W−1, L is the number of matrix rows, and W is the number of matrix columns, comprising:

(a) means for performing numerical analysis on the digital image with a computer by computing a maximum gradient of at least one scan line;

(b) means for rejecting the digital image when the maximum gradient is above a ceiling threshold value; and (c) means for accepting image device performance when an average of maximum gradient values over some period of time exceeds a predefined threshold.

3. A computer program product having a computer readable medium having computer program logic recorded thereon for determining performance of an image capture device collecting a digital image, D, wherein D is represented as an L×W matrix of numbers representative of light intensity contained within cells denoted as $D_{ij}$, where i=0 to L−1, j=0 to W−1, L is the number of matrix rows, and W is the number of matrix columns, said computer program product comprising:

computer readable program code means for performing numerical analysis on the digital image with a computer by computing a maximum gradient of at least one scan line; and computer readable program code means for rejecting the digital image when the maximum gradient is above a ceiling threshold value; and computer readable program code means for accepting device performance when an average of maximum gradient values over some period of time exceeds a predefined threshold.

4. Method for determining image quality of a digital image, D, wherein D is represented as an L×W matrix of numbers representative of light intensity contained within cells denoted as $D_{ij}$, where i=0 to L−1, j=0 to W−1, L is the number of matrix rows, and W is the number of matrix columns, comprising the steps of:

performing numerical analysis on the digital image with a computer by computing a maximum gradient of at least one scan line;

comparing the maximum gradient to a ceiling threshold value; and rejecting the digital image as representing an imaging system problem when the maximum gradient is above the ceiling threshold.

5. Method of claim 4 wherein the step of rejecting the digital image further comprises rejecting the digital image as representing a PEL problem when the maximum gradient is above the ceiling threshold.

6. Method of claim 4 further comprising the steps of:

comparing the maximum gradient to a floor threshold value; and rejecting the digital image as representing a focusing problem when the maximum gradient is below the floor threshold.

7. Apparatus for determining image quality of a digital image, D, wherein D is represented as an L×W matrix of numbers representative of light intensity contained within cells denoted as $D_{ij}$, where i=0 to L−1, j=0 to W−1, L is the number of matrix rows, and W is the number of matrix columns, comprising:

means for performing numerical analysis on the digital image with a computer by computing a maximum gradient of at least one scan line and comparing the maximum gradient to a ceiling threshold value; and means for rejecting the digital image as representing an imaging system problem when the maximum gradient is above the ceiling threshold.

8. Apparatus of claim 7 wherein the means for rejecting the digital image further comprises means for rejecting the digital image as representing a PEL problem when the maximum gradient is above the ceiling threshold.

9. Apparatus of claim 7 further comprising:

means for comparing the maximum gradient to a floor threshold value; and means for rejecting the digital image further comprises means for rejecting the digital image as representing a focusing problem when the maximum gradient is below the floor threshold.

10. A computer program product having a computer readable medium having computer program logic recorded thereon for determining image quality of a digital image, D, wherein D is represented as an L×W matrix of numbers representative of light intensity contained within cells denoted as $D_{ij}$, where i=0 to L−1, j=0 to W−1, L is the number of matrix rows, and W is the number of matrix columns, said computer program product comprising:

computer readable program code means for performing numerical analysis on the digital image with a computer by computing a maximum gradient of at least one scan line and comparing the maximum gradient to a ceiling threshold value; and computer readable program code means for rejecting the digital image as representing an imaging system problem when the maximum gradient is above the ceiling threshold.

11. Computer program product of claim 10 wherein the means for rejecting the digital image further comprises computer readable program code means for rejecting the digital image as representing a PEL problem when the maximum gradient is above the ceiling threshold.

12. Computer program product of claim 10 further comprising:

computer readable program code means for comparing the maximum gradient to a floor threshold value; and computer readable program code means for rejecting the digital image as representing a focusing problem when the maximum gradient is below the floor threshold.

* * * * *